United States Patent [19]

Schucker

[11] 4,453,887
[45] Jun. 12, 1984

[54] VIBRATION-DAMPENED DISCHARGE RING FOR BULB HYDRAULIC TURBINES

[75] Inventor: Thomas R. Schucker, York, Pa.

[73] Assignee: Allis-Chalmers Corporation, Milwaukee, Wis.

[21] Appl. No.: 327,924

[22] Filed: Dec. 7, 1981

[51] Int. Cl.³ .......................... F01D 5/10; F03B 11/04
[52] U.S. Cl. .................................... 415/119; 181/256
[58] Field of Search ............... 415/119; 181/252, 256, 181/224, 284

[56] References Cited

U.S. PATENT DOCUMENTS

| 2,808,227 | 10/1957 | Danel | 415/119 |
| 3,949,830 | 4/1976 | Muehlbauer et al. | 181/224 |
| 4,034,826 | 7/1977 | Andrews | 181/224 |
| 4,174,020 | 11/1979 | Challis | 415/119 X |
| 4,314,621 | 2/1982 | Hansen | 181/252 X |

FOREIGN PATENT DOCUMENTS

| 525721 | 5/1956 | Canada | 181/256 |
| 1234151 | 10/1960 | France | 181/256 |
| 641173 | 8/1979 | U.S.S.R. | 415/119 |

Primary Examiner—Harvey C. Hornsby
Assistant Examiner—Christine A. Peterson
Attorney, Agent, or Firm—Timothy R. Conrad

[57] ABSTRACT

A discharge ring for a hydraulic turbine is disclosed for reducing noise and vibration emanating from the discharge ring. The discharge ring comprises an inner and outer ring separated by spacer ribs. A plurality of cavities within the ring are provided, filled with a massive granular material such as sand. Removable plates along the outer ring permit filling and emptying the cavities to reduce the weight of the ring and facilitate removal of the ring for inspection and maintenance.

4 Claims, 3 Drawing Figures

VIBRATION-DAMPENED DISCHARGE RING FOR BULB HYDRAULIC TURBINES

BACKGROUND OF THE INVENTION

1. Field of the Invention

This invention relates to hydraulic turbines having runners with generally horizontal axes of rotation. Particularly, this invention relates to a vibration-dampened discharge ring surrounding the runner to reduce noise and vibration emanating from the ring during operation of the turbine.

2. Description of the Prior Art

In the prior art, hydraulic turbines are well known for the production of hydroelectric power. Such turbines typically are constructed with cylindrical discharge rings surrounding the turbine blades for guiding flowing water past the blades.

Such turbines are constructed for either vertical or horizontal operation. In vertical turbines, the discharge ring is commonly embedded in a concrete foundation. Examples of such vertical turbines are found in U.S. Pat. Nos. 1,833,146 to Woodard dated Nov. 24, 1931; 1,934,636 to Martin dated Nov. 7, 1933 and 2,701,313 to Obrist dated Feb. 1, 1955. On horizontal turbines, the discharge ring is commonly exposed within an access chamber formed within the foundation such as shown in U.S. Pat. No. 3,535,540 to Boulogne dated Oct. 20, 1970.

Exposing the discharge ring to the atmosphere, as is common in horizontal turbines, has resulted in undesirable effects. Namely, vibrational forces caused by flowing water and operation of the turbine are transmitted to the discharge ring resulting in a great deal of noise emanating from the discharge ring. This noise is particularly troublesome when the turbines are installed near populous areas and to workers in the turbine powerhouse.

To deaden the noise, it has been suggested to coat the discharge ring with styrofoam or other insulating material. However, such attempts are only moderately successful since they fail to dampen the vibration which is the major source of the noise.

It is well known to dampen the vibration, and hence the noise, of an object by increasing its mass. However, such a suggestion applied to hydraulic turbines presents additional problems. Adding to the thickness of a discharge ring would increase its mass but such rings are formed from structural steel which is expensive and costly to shape.

Additionally, adding to the thickness of the discharge ring or permanently filling the discharge ring with a massive material greatly adds to the weight of the ring. At the time of installation of the ring, and at times during the life of the turbine, removal of the ring is necessary. By increasing the mass of the ring, the weight is so great that removal is impossible or requires very costly, heavy cranes and other equipment as well as costly modifications to foundations to support the equipment.

The object of the present invention is to provide a discharge ring of sufficient mass to eliminate the vibration of the ring and resulting noises.

It is a further object of the invention to provide a massive discharge ring which is susceptible to easy removal.

SUMMARY OF THE INVENTION

According to a preferred embodiment of the present invention, there is provided a discharge ring for a hydraulic turbine. The discharge ring has a cylindrical inner ring coaxial with a generally horizontal axis of rotation of a turbine runner equipped with turbine blades. An outer ring, surrounding the inner ring, is supported by spacer ribs affixed to the inner ring.

The outer ring includes removable fill plates for permitting the introduction of massive granular material into cavities within the discharge ring. Removable discharge plates along the lower portion of the outer ring permit the granular material to be removed by allowing it to spill out of the cavities due to the influence of gravity. During the operation of the turbine, noise and vibration emanating from the discharge ring are absorbed and reduced by the massive granular material within the ring.

DESCRIPTION OF THE PREFERRED EMBODIMENT

Figure 1:
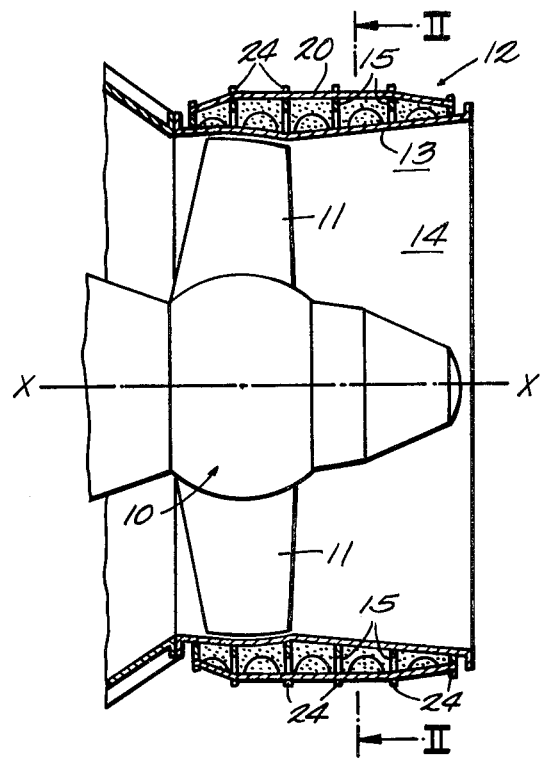
FIG. 1 is a side view of a runner of a hydraulic turbine showing a discharge ring.
Figure 2:
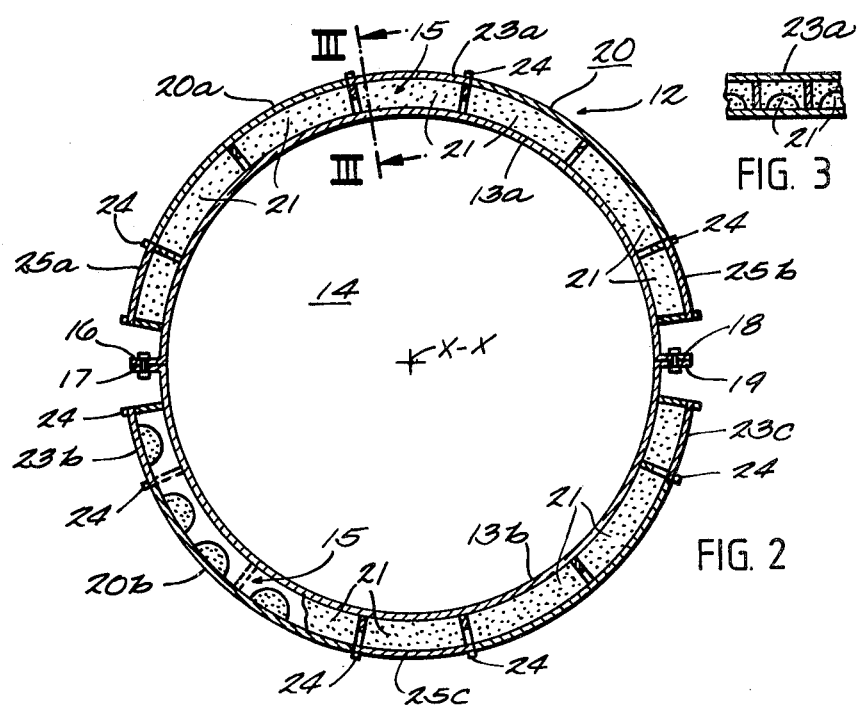
FIG. 2 is a view of the discharge ring taken along line II—II of FIG. 1.

Referring to FIG. 1, a rotary runner 10 of a hydraulic turbine with a generally horizontal axis of rotation X—X. Runner 10 is equipped with a plurality of adjustable runner blades 11. A generally cylindrical discharge ring 12 surrounds turbine blades 11. An inner ring 13 of plate steel or other suitable material defines a hydraulic passageway 14 for guiding water past turbine blades 11. As shown in FIG. 2, inner ring 13 is formed by an upper half ring 13a and a lower half ring 13b. Half rings 13a, 13b are provided with flanges 16, 17, 18 and 19. Inner ring 13 is formed by joining upper half ring 13a and lower half ring 13b along the flanges 16, 17, 18 and 19.

Figure 3:
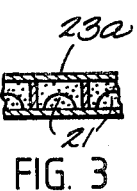
FIG. 3 is a view of a spacer rib.

As shown in FIGS. 1 and 2, a plurality of axial and circumferential spacer ribs 15 are provided affixed to inner ring 13 and extending radially outwardly therefrom. Spacer bars 15 extend radially outwardly from inner ring 13 of like distance with, as shown in FIG. 3, spacer ribs 15 defining self-contained openings to permit communication between cavities formed within discharge ring 12 as will be described hereafter.

A generally cylindrical outer ring 20 is provided surrounding inner ring 13 and supported upon spacer ribs 15. Outer ring 20 includes an upper outer half-ring 20a supported upon spacer ribs 15 affixed to upper half-ring 13a and a lower outer half-ring 20b supported upon spacer ribs 15 affixed to lower half-ring 13b. Outer half-rings 20a, 20b, inner half-rings 13a, 13b, and spacer bars 15 cooperate to define a plurality of interconnected cavities, such as at 21, within discharge ring 12. Cavities 21 are filled with suitable granular vibration attenuation material such as sand or perlite.

Outer half-rings 20a, 20b include a plurality of axially disposed removable fill plates 23a, 23b, and 23c. Fill plates 23a, 23b and 23c are joined to outer half-rings 20a, 20b along spacer ribs 15 by bolts or other suitable means such as at 24.

Fill plates 23a, 23b and 23c are joined to outer half-rings 20a, 20b at the upper most portions of said rings 20a, 20b. Likewise, a plurality of removable discharge plates 25a, 25b, 25c are provided axially disposed along outer rings 20a, 20b at lower most portions of said rings.

In the operation of the invention, fill plates 23a, 23b and 23c are removed. Sand or other suitable granular material is introduced to cavities 21 where the plates are removed. Since cavities 21 are interconnected, gravity causes the sand to tumble downwardly filling all of cavities 21 within discharge ring 12. During operation of the turbine, vibratory forces produced by water flowing through passageway 14 and rotation of runner 10 are absorbed by the sand contained in cavities 21. When desirable to remove discharge ring 12, discharge plates 25a, 25b and 25c are removed and the sand is permitted to spill out of cavities 21 thereby reducing the weight of discharge ring 12 and facilitating easy removal.

From the foregoing detailed description of the present invention, it has been shown how the objects of the present invention have been attained in a preferred manner. However, modification and equivalents of the disclosed concepts, such as readily occur to those skilled in the art, are intended to be included in the scope of this invention. Thus, the scope of the invention is intended to be limited only by the scope of the claims such as, or may hereafter be, appended hereto.

The embodiment of the invention in which an exclusive property or privilege is claimed is defined as follows:

1. A discharge ring for a hydraulic turbine having a rotary runner hub with a generally horizontal axis of rotation; a plurality of turbine blades extending radially from said runner; said discharge ring having a generally cylindrical inner ring surrounding said turbine blades with said inner ring defining a hydraulic passageway for guiding water past said turbine blades; the improvement comprising:
   a. a generally cylindrical outer ring of greater diameter than said inner ring and surrounding said inner ring; said outer ring being radially spaced from said inner ring and supported by a plurality of longitudinal and circumferential spacer ribs mounted on and projecting radially from said inner ring;
   b. said outer ring, inner ring and spacer ribs cooperating to define a plurality of cavities including highest elevation cavities and lowest elevation cavities within said discharge ring; vibration attenuation means comprising granular material within said cavities;
   c. means formed within a plurality of said spacer ribs permitting gravity flow material communication between said cavities;
   d. means for exposing highest elevation cavities comprising a fill plate sized to cover only said highest elevation cavities and means to removably secure said fill plate to said outer ring to complete said outer ring to cover said highest elevation cavities; and
   e. means for exposing said lowest elevation cavities comprising a discharge plate sized to cover said lowest elevation cavities and means to removably secure said discharge plate to said outer ring to complete said outer ring to cover said lowest elevation cavities whereby said highest elevation cavities may be exposed and said lowest elevation cavities unexposed to permit filling the cavities with said material by admitting said material to said highest elevation cavities with said material flowing by means of gravity to the cavities to increase the mass of said ring and abate vibration of said ring and said material may be discharged from said ring by exposing said lowest elevation cavities to decrease the weight of said ring and facilitate removal and maintenance of said ring.

2. A discharge ring according to claim 1, wherein said ring comprises an upper half-ring and a lower half-ring; means for joining said upper half-ring with said lower half-ring to form said discharge ring; said upper half-ring and lower half-ring each having a fill plate and a discharge plate at respective uppermost and lowermost portion of said half-rings whereby the weight of each half-ring may be selectively increased by admitting said material through said fill plates to increase the mass of the half-ring to a mass sufficient to abate vibration of said ring and the weight of each half-ring may be selectively decreased by discharging said material through said discharge plates to permit separate maintenance and removal of each half-ring.

3. A discharge ring according to claim 2, wherein said means formed within a plurality of said spacer ribs comprises a plurality of holes formed within said ribs permitting gravity flow material communication between said cavities.

4. A discharge ring according to claim 3, wherein said holes are formed within radially outer edges of said spacer ribs of said lower half-ring and radially inner edges of said spacer ribs of said upper half-ring.

* * * * *